Figure 1:
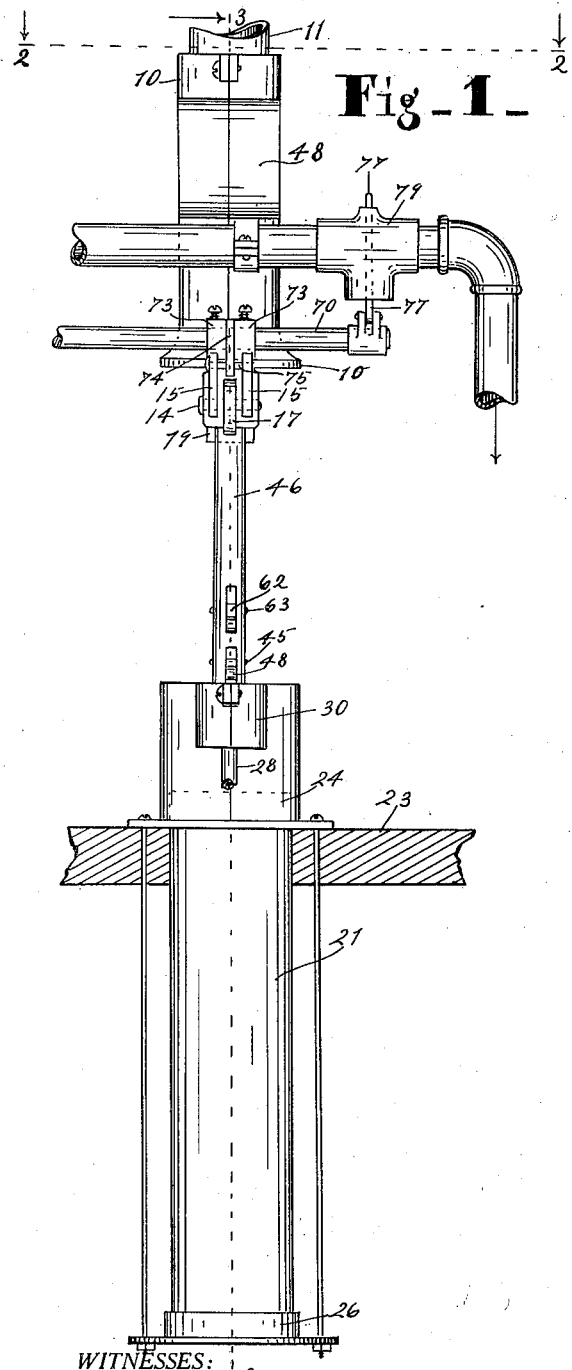

T. BEMIS.
PNEUMATIC DESPATCH APPARATUS.
APPLICATION FILED APR. 23, 1908.

1,079,311.  
Patented Nov. 18, 1913.  
5 SHEETS—SHEET 1.

WITNESSES:  
Olive Breeden  
J. H. Swan

INVENTOR.  
Thomas Bemis  
BY V. H. Lockwood,  
ATTORNEY.

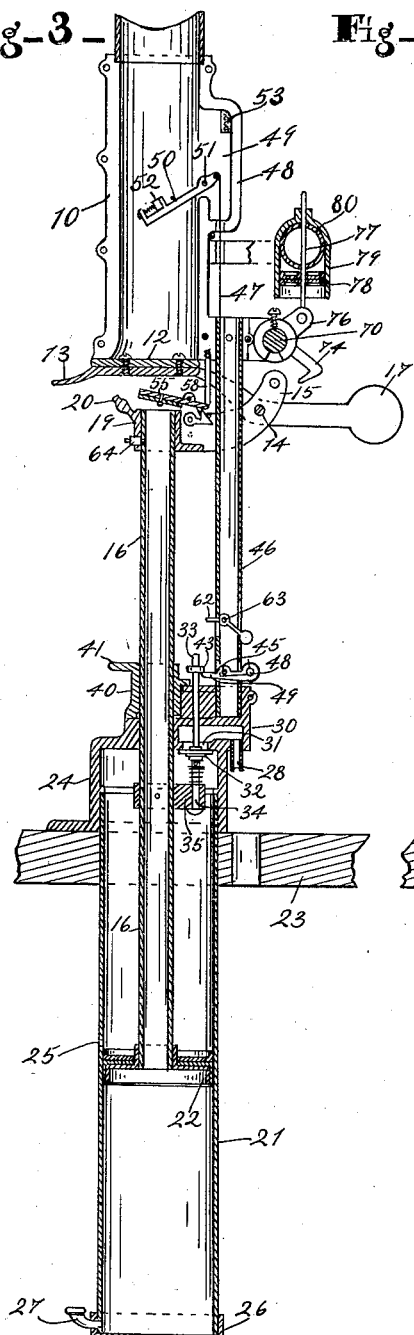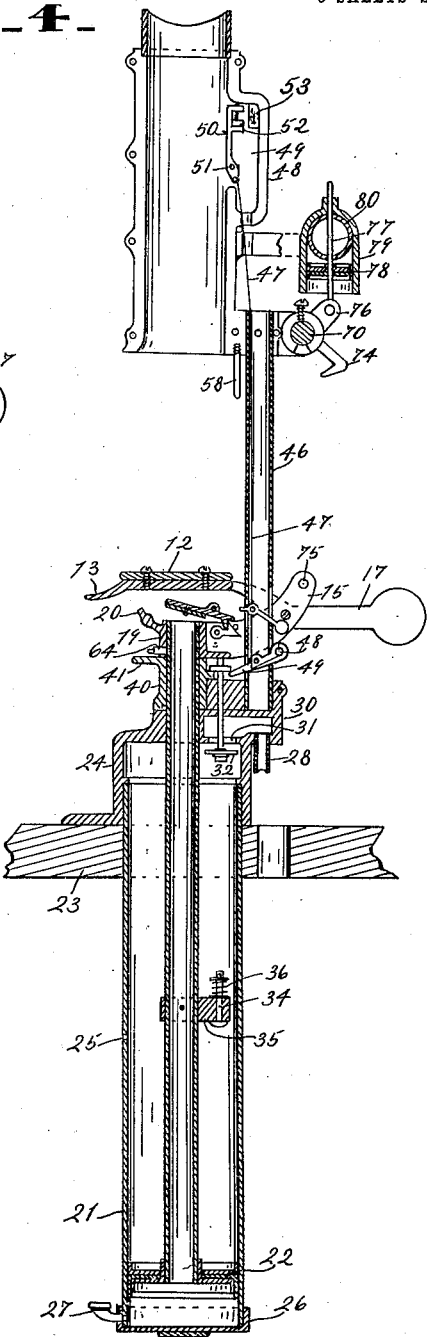

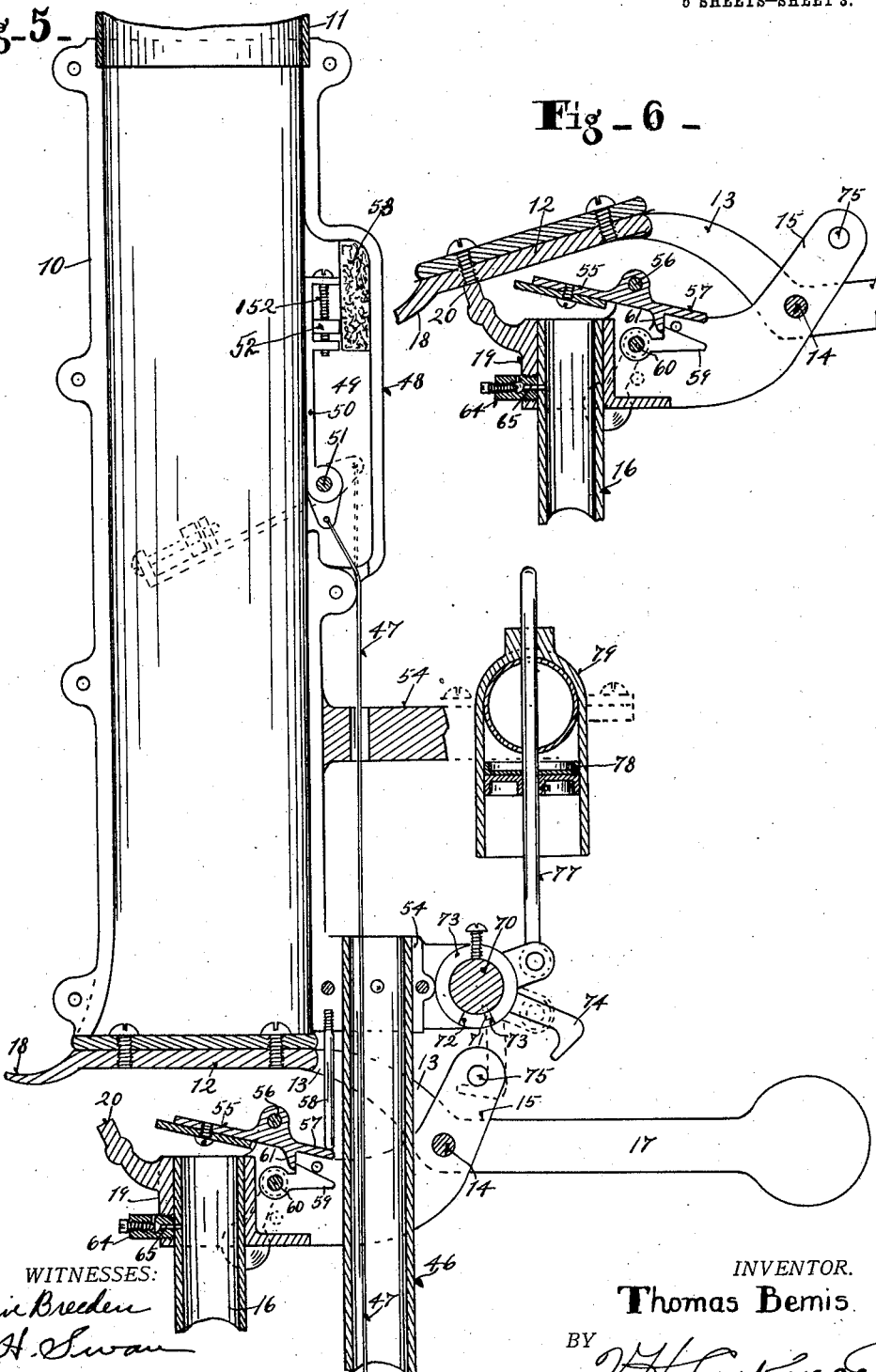

T. BEMIS.
PNEUMATIC DESPATCH APPARATUS.
APPLICATION FILED APR. 23, 1908.
1,079,311.
Patented Nov. 18, 1913.
5 SHEETS—SHEET 4.
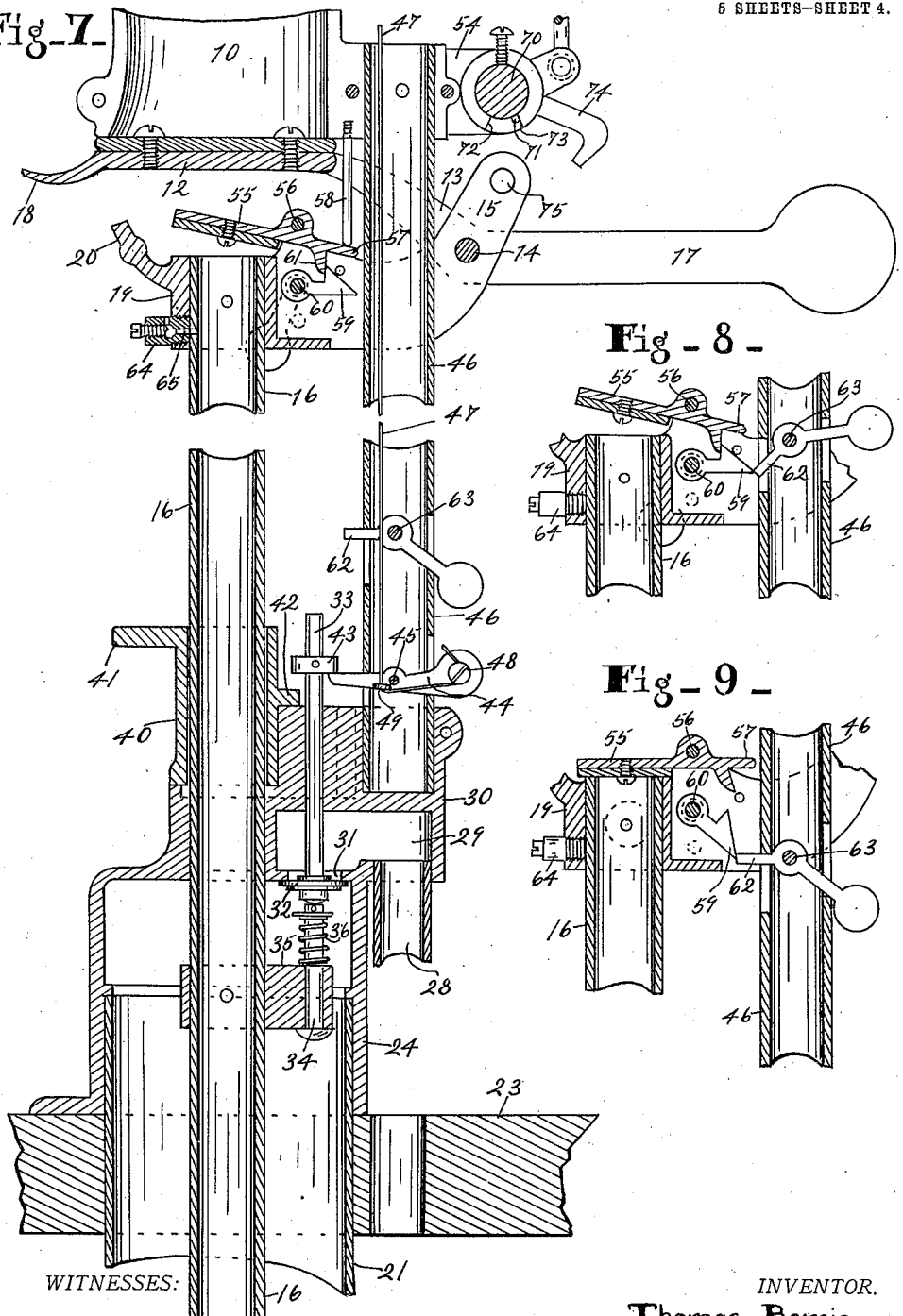
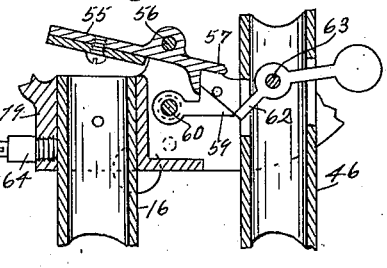
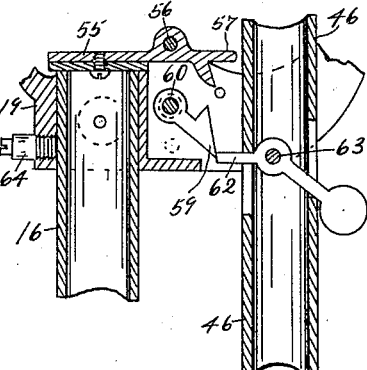
WITNESSES:
Olive Breeden
J. H. Swan
INVENTOR.
Thomas Bemis.
BY
V. H. Lockwood
ATTORNEY.

T. BEMIS.
PNEUMATIC DESPATCH APPARATUS.
APPLICATION FILED APR. 23, 1908.
1,079,311.
Patented Nov. 18, 1913.
5 SHEETS—SHEET 5.
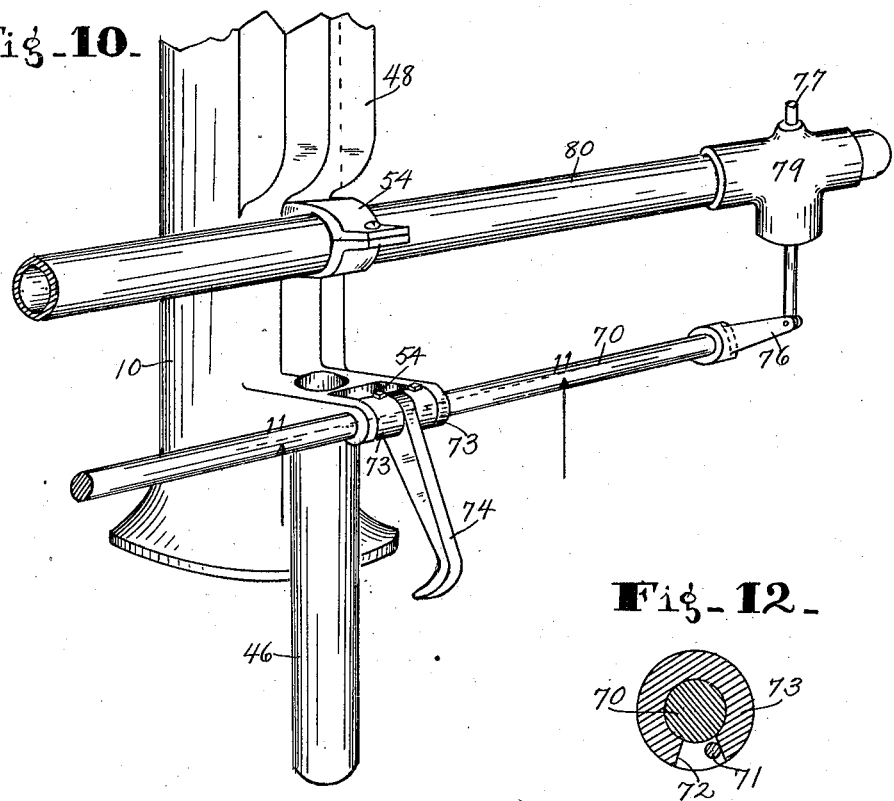
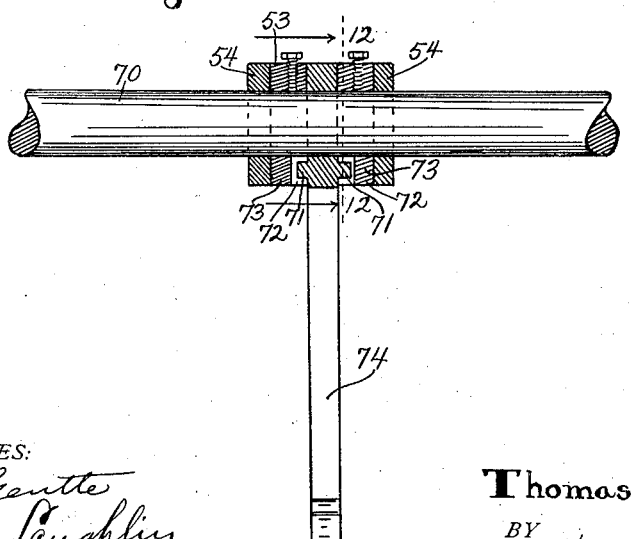
WITNESSES:
W. M. Gentte
O. M. McLaughlin
INVENTOR.
Thomas Bemis.
BY V. H. Lockwood.
ATTORNEY.

UNITED STATES PATENT OFFICE.

THOMAS BEMIS, OF INDIANAPOLIS, INDIANA, ASSIGNOR, BY MESNE ASSIGNMENTS, TO AMERICAN PNEUMATIC SERVICE COMPANY, OF BOSTON, MASSACHUSETTS, A CORPORATION OF DELAWARE.

PNEUMATIC-DESPATCH APPARATUS.

1,079,311. Specification of Letters Patent. Patented Nov. 18, 1913.

Application filed April 23, 1908. Serial No. 428,734.

*To all whom it may concern:*

Be it known that I, THOMAS BEMIS, of Indianapolis, county of Marion, and State of Indiana, have invented a certain new and useful Pneumatic-Despatch Apparatus; and I do hereby declare that the following is a full, clear, and exact description thereof, reference being had to the accompanying drawings, in which like letters refer to like parts.

The object of this invention is to improve the construction of pneumatic despatch apparatus, so as to reduce the expense of operating the same by saving the power. This object is accomplished, broadly speaking, by limiting the operation of the pneumatic apparatus in the system to the portion in actual use and the time when it is in use. Usually in such systems there is constant suction of air through the parts of the tubes or system which requires heavy work on the part of the vacuum pump.

The main feature, therefore, of this invention consists in providing means, chiefly automatic, for limiting the suction to the part or portion of the system through which a carrier is passing and only while a carrier is passing through. The parts of the system through which a carrier is not passing is kept closed and when no carrier is being transmitted all parts of the system are closed, whereby the amount of work required by the vacuum pump is very greatly reduced and a considerable saving results therefrom. To that end I provide a construction in which the air for the transmission of the carrier enters through the carrier inlet opening. Said opening is kept normally closed, excepting while a carrier is passing through the apparatus; and while thus closed there is a partial vacuum in the despatch tube. But when a valve at any station is opened to insert a carrier, the air rushes in at such station and transmits the carrier to its destination.

Therefore, one feature of my invention consists in providing proper means for opening the carrier or air inlet opening at the central station for the transmission of the carrier from either the central station or from an outlying station on the same line.

Another feature of the invention consists in providing improved means that will permit the central station operator to manipulate the timing mechanism should she find it necessary to insert a second carrier before the valve had finally closed the carrier inlet opening after the insertion of the preceding carrier, or at any point during the travel of said valve mechanism between its limits of movement. In such instance the operator causes said timing means to return and move again through its entire course of travel. Likewise, improved means controlled by the air in the despatch tube and therefore by the opening of a valve at an outlying station, is provided for causing the timing mechanism, if it happens to be moving toward a closing position, to return and pass through its course and thus enable the air to pass through the tube long enough to cause the carrier to reach its destination.

Another feature of the invention consists in pneumatically operated means for holding the carrier inlet valves closed when the vacuum pump is stopped so that the pump when starting can immediately control said valves.

The full nature of this invention will be understood from the accompanying drawings and the following description and claims.

Figure 2:
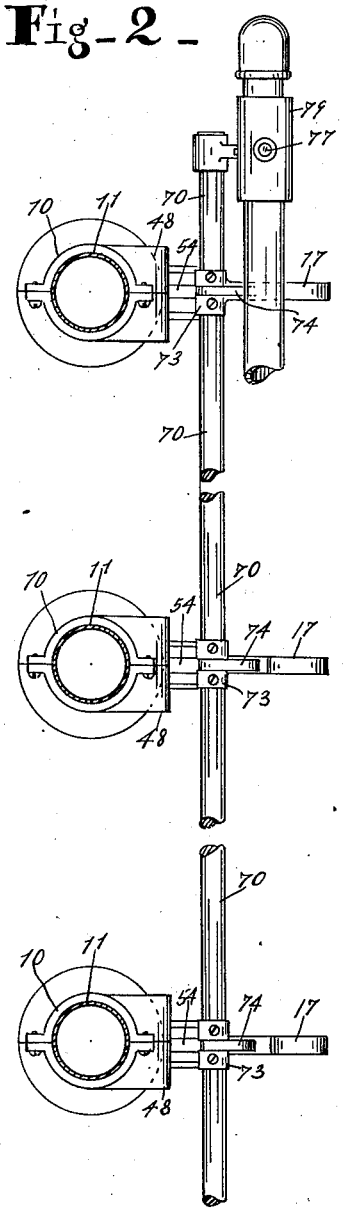

In the drawings Figure 1 is an elevation of the carrier inlet end of the pneumatic despatch tube at the central station and the means provided for controlling the closing and opening movements of the valve, parts being broken away and a part in vertical section. Fig. 2 is a horizontal section through three central carrier inlet terminals in a system, on the line 2—2 of Fig. 1, and a plan view of the associated parts for locking the valves closed when the vacuum pump stops, parts being broken away. Fig. 3 is a central vertical section through the terminal at the central station, showing the position of the parts when the carrier inlet opening is closed. Fig. 4 is the same with the parts in position when the valve closing the carrier inlet is at its lowest limit of movement, the despatch tube being open for the passage of a carrier through it in either direction. Fig. 5 is a similar section to that shown in the upper part of Fig. 3 but on a larger scale. Fig. 6 is a central vertical section through the upper end of the valve mounting means, the valve shown in its open position. Fig. 7 is the same as the central part of Fig. 3 but on a larger scale, being centrally broken away. Fig. 8 is a section through the upper part of the valve supporting means, showing the means for keeping open the upper end of the piston tube as it starts downwardly to the station. Fig. 9 is the same just after it has reached its downward limit of movement and the piston tube is closed. Fig. 10 is a perspective view of the lower end of the terminal and means behind the same for catching the valve. Fig. 11 is a longitudinal section along the line 11—11 of Fig. 10. Fig. 12 is a cross section on the line 12—12 of Fig. 11.

In the drawings three terminals for the inlet of air and carriers at a central station are shown in Fig. 2 and one of said terminals is shown in the other figures, all of said central station inlet terminals being alike. Therefore, 10 represents a central inlet terminal for the air and carrier to the despatch tube 11 that leads to an outlying station. The lower end of the part 10 is the opening into which a carrier is inserted and through which the air enters for conveying the carrier to its destination. This inlet terminal 10 of the apparatus is vertically disposed in the form herein shown. The inlet terminal referred to is closed by a valve 12 which is not mounted on said terminal but on a vertically movable means. Said valve is carried on a lever 13 fulcrumed at 14 in the pair of arms 15 which extend from the upper end of the piston tube 16. The lever 13 has a counter-balance 17 and the valve 12 has a forwardly extending projection 18 which the operator strikes from above with the felt of the carrier in order to open the valve and release it from the influence of the partial vacuum or suction in the despatch tube and inlet terminal. The arm 15 is secured to the piston tube 16 by a tubular casing 19, which has a stop arm 20 that limits the opening movement of the valve 12, as shown in Fig. 6, when the operator opens said valve from the position shown in Fig. 7.

The piston tube 16, which carries the valve 12, extends into the cylinder 21 and has at its lower end a piston 22, said piston being centrally apertured so that the piston tube 16 is tubular throughout and opens into the lower end of the cylinder. Said cylinder extends through the table or desk top 23 and is supported thereon by the casting 24 to which the upper end of the cylinder is fastened. Said cylinder has a small inlet opening 25 just above the upper limit of movement of the piston 22. The piston is preferably surrounded by leather and there is provided for having an oil reservoir 26 at the lower end of the cylinder, the oil therein being maintained at a certain level by the upturned closed oil inlet 27, so that the piston at each downward limit of its movement will engage the oil and the leather thereof be kept oiled for causing a tight fit always between the piston and the cylinder.

The casting 24 serves as a guide for the piston tube 16. The piston is elevated by en exhaust or suction through the tube 28 running to a suction reservoir from the chamber 29 in the casing 30 that is integrally connected with the casting 24. There is an opening 31 from the chamber 29 into the upper end of the cylinder. The piston descends by gravity, when the suction through tube 28, chamber 29, and port 31 is terminated by the valve 32 closing the port 31. This valve is mounted on the lower end of a valve rod or stem 33 that is vertically reciprocable in the casing 30 at the upper end of the casting 24. Valve 32 is closed by the pin 34 mounted reciprocably in the block 35 that is secured to the piston tube 16. The pin 34 is pushed upwardly from the block 35 by a spring 36. When the piston reaches its upper limit of movement, as shown in Fig. 7, the valve 32 is closed by the means specified. When the piston descends, as shown in Fig. 4, the block 35 moves away from the valve 32. This block 35 is held from turning by the arms 15 that travel up and down along the fixed tube 46 and is secured to tube 16. This keeps the block 35 in such position that the pin 34 will engage the lower end of the valve stem 33 when it moves to its upper position, as shown in Fig. 3.

Means is also provided for the valve 32 to be closed by the operator. This consists of the sleeve 40 that is vertically slidable on the piston tube 16 by lifting on the projection 41 so that the lug 42 will engage a collar 43 secured on the valve stem 33. Another means is provided for the automatic closing of the valve 32. It consists of the small lever 44, fulcrumed at 45 in the lower end of the tube 46 fastened at its lower end in the casing 30, as shown in Fig. 7. This lever 44 projects under the collar 43 so as to lift it, as seen in Fig. 7, but normally the engaging end of said lever drops by gravity to a disengaging position. The lever is actuated by a small flexible wire 47 that is fastened by the screw 48 to one end of the lever 44 and passes under said lever through the notch 49 up through the tube 46 and through the lower end of the enlargement 48 of the inlet terminal 10 so as to form a recess 49 in which a paddle arm 50 is fulcrumed at 51 and to the rear end of it said wire 47 is attached. The wire is so arranged that when the paddle 50 is in the position shown in Fig. 3, the wire will be taut and help lift the lever 44 and valve 32, but when the paddle is elevated, as shown in Fig. 4, the wire 47 will be quite lax. A buffer 53 stops the upward movement of the paddle 50 which movement is caused by the passage of air upwardly through the inlet terminal. The downward movement of the paddle 50 is caused by gravity when there is no air passing through said terminal. Weight 52 adjustable on screw 152 is provided for increasing or diminishing slightly the gravity of the paddle 50 so that it may be adjusted readily for positive and satisfactory operation. The tube 46 at its upper end is fastened in the bracket 54 that is secured to the lower end of the inlet terminal, as seen in Fig. 7.

At times it is desirable that the upper end of the piston tube be closed and therefore a valve 55 is provided that is fulcrumed at 56 so the valve will close by gravity. It has a rearwardly extending projection 57 that is adapted to engage and be depressed by the pin 58 that extends downwardly from the bracket 54, when the valve 12 in its upward movement reaches the closing position, as shown in Fig. 7. When the valve 55 is thus opened, as shown in Fig. 7, it is held open while the valve 12 is descending, by a gravity-controlled trip 59 fulcrumed at 60 to the arm 15 catching or engaging the spur 61 from the rear end of the valve 55. As the piston tube 16 descends the valve 55 remains open until it has reached the lower limit of movement and after it has started upwardly and as it moves upwardly the trip 59 is engaged by another trip 62 fulcrumed at 63 in the tube 46, which disengages the trip 59 from the valve 55, as shown in Fig. 9, so that during the remaining upward movement of the piston tube, the valve 55 will be closed. The trip 62 does not affect either the valve 55 or trip 59 during their downward movement, as appears in Fig. 8.

What is called a timing plug 64 is provided for adjusting the air inlet port 65 that enters the piston tube near its upper end, as seen in Figs. 6 and 7. By enlarging the port 65 the piston will move upwardly more rapidly, as will hereafter be explained and by diminishing said port it will be made to move more slowly so that by adjusting the plug 65 the means for moving the valve 12 can be so timed that the valve will require sufficient time to move upwardly to its closing position, to enable the carrier to pass through the despatch tube and reach its destination.

Behind the series of inlet terminals an oscillatory rod 70 is mounted on the brackets 54 and upon said rod catches 74 are loosely mounted adjacent collars 73 secured on the rod and each collar having a recess 72 in it into which a clutch lug 71 projects from the catch 74. There is one catch 74 for each inlet terminal and is adapted to be oscillated by said rod 70 downwardly to catch under the pin 75 on the arm 15, as seen in Fig. 7. When in this position the catch 74 will hold the valve 12 closed even when the vacuum pump is not in operation. When the rod 70 is oscillated in the opposite direction it will throw the catch 74 into the open position seen in Fig. 4 and thus release and no longer support the arm 15 and other means carrying the valve 12.

The shaft 70 is actuated by the arm 76 connected therewith to which a piston rod 77 is pivoted that carries a piston 78 in a cylinder 79 and is actuated by the gravity of the piston 78 when the vacuum pump is stopped. That oscillates the rod 70 and moves all of the catches 74 in position to maintain the valves 12 closed. When the vacuum pump is started again the suction through pipe 80 lifts the piston and disengages the catches from the pin 75.

The mode of operation of the device will now be explained.

It may be stated that the mechanism which has been described is only at the central station and not at the outlying stations, but at the outlying stations there are inlet terminals closed by flap valves or the like through which carriers may be inserted, and which construction is familiar to all those skilled in the art. Assuming the mechanism to be in its normal position with the valve 12 closed, as shown in Fig. 7, the central station operator, when she desires to send a carrier, strikes down upon the projection 18, which opens the valve to the position shown in Fig. 6. The suction through the pipe 28, chamber 29 and port 31 having been terminated when the valve 12 had previously reached its closing position, the piston 22, piston tube 16 and valve 12 descend by gravity and when the valve has descended far enough the operator inserts the carrier into the inlet opening, and the ingoing air carries it through the despatch tube. The valve 12 continues to descend until it reaches its lower limit of movement, as shown in Fig. 4, where the arm 15 depresses the valve stem 33 and opens the valve 32, which has been held elevated and closed by suction through the chambers 29 and 30. During the downward movement of the piston tube 16 the valve 55 at the upper end is open so that air from the cylinder may escape through the tube 16. As soon as the valve 32 is thus opened the exhaust through the port 31 and tube 28 immediately begins to cause the elevation of the piston 22 and tube 16 and when the trip 59, while moving upwardly, reaches the trip 62, the valve 55 will be closed so that no air can enter through the tube 16 and then the exhaust through the port 31 will continue to move the piston upwardly until the valve reaches the closing position. This period of time which is controlled by valve 64 will permit the carrier to reach its destination. As the valve 12 reaches its closing position, the pin 34 closes the valve 32, shutting off the exhaust from the cylinder and pin 58 above opens the valve 55 so as to relieve any air pressure in the cylinder, for thereafter the suction through the inlet terminal will suffice to hold the valve 12 closed and the connected parts elevated. The small port 25 in the cylinder permits the air to escape from the cylinder above the piston 22 as the piston moves upwardly. The port 65 modifies the effect on the piston of the exhaust from the cylinder through the port 31. Thus, if the port 65 be relatively large, the air passing through the tube 16 to the lower part of the cylinder will more rapidly enter the lower part of the cylinder under the piston. If the port 65 be small the air will more slowly enter the lower part of the cylinder and therefore the cylinder be correspondingly retarded in its upward movement. Hence, by adjusting the plug 64 the speed of the closing movement of the piston 22 will be increased or diminished so as to give the carrier time to reach its destination. If the central station operator desires to send a second carrier before the valve controlling mechanism has completed its round-trip movement, she lifts the sleeve 40 so as to close the valve 32 and inserts the second carrier. Then the piston will descend until it reaches its lower limit of movement and re-open the valve 32 and cause the ascent of the valve 12. This will give the second carrier time to reach its destination.

If a person inserts a carrier at an outlying station to be sent to the central station, when the central station inlet opening is closed, as soon as the carrier is inserted at the outlying station, the suction or vacuum in the central station inlet terminal ceases, which permits the valve 12 to drop to the position shown in Fig. 6 and then the valve controlling mechanism will descend and ascend as above described and thus permit the carrier to reach the central station before the valve 12 reaches its closing position. But it sometimes happens that the clerk at the outlying station inserts a carrier while the valve 12 is open and is traveling upwardly. Therefore, in order to prevent the valve closing before said carrier reaches the central station, I provide means for causing the controlling mechanism to descend and make a return trip. This means consists of the paddle 50 which, while the valve 12 is open and the air is passing through the despatch tube, is maintained in a vertical position, as shown in Fig. 4, by the passage of the air. But as soon as the clerk at the outlying station inserts her carrier, the passage of air through the despatch tube ceases and then the paddle 50 drops to its open position, as shown in Fig. 3, by gravity and through the wire 47 and lever 44 closes the valve 32. This permits the piston 22 and tube 16 to descend again and make a return trip during which time the carrier can reach the discharge terminal at the central station.

While the vacuum pump for the apparatus is stopped and the apparatus is not in use, the valves 12 in the system should all be held closed to enable the apparatus to begin operation when the vacuum is started again. For, if the valves were allowed to open and the vacuum pump be started again, the valves would have to be individually closed by hand for the vacuum or air would not be sufficient to act on all the valves. Therefore, the means heretofore described, consisting of the rod 70, catch 74 and the pneumatic lift are operated as the pump is shut down and they hold the valves closed. This holding means is released after the pump is started in the manner heretofore explained.

All or any part of this device may be taken to an outlying station and arranged to operate, also in a system where the carriers enter a separate inlet and this becomes a mere inlet opening without departing from my invention. It can be used for conveying parcels of any description or for other similar purposes. It may be further understood that modifications, such as would result from a reversal of parts or operations may be substituted without departing from my invention.

The device, as here shown, is for an inlet that leads upright, and when this device is to be used for an inlet that leads downwardly, then this device can be reversed, the piston pulling valve 7 upwardly off the seat by vacuum and when 24 is closed it descends by gravity only as fast as the timer will permit, and therefore, this invention covers all this reversal of position and operation.

What I claim as my invention and desire to secure by Letters Patent is:

1. Pneumatic despatch apparatus including an air inlet terminal, a valve for closing said terminal, means for closing said valve, an arm projecting into the carrier passageway of said terminal into position to be controlled by the carrier moving air current through said passageway for causing the closing operation of said valve closing means, and connections from said arm to said valve closing means controlling the operation of the same.

2. Pneumatic despatch apparatus including an air inlet terminal, a valve for closing the same, means for closing the said valve, an arm projecting into the carrier passageway of said terminal and mounted in position to be actuated in one direction by gravity and in the other direction by the air current through said passageway of the terminal and when so actuated to control the operation of said valve closing means, and connections from said arm to said valve closing means controlling the operation of the same.

3. Pneumatic despatch apparatus including an air inlet terminal, a valve for closing the same, means for closing the said valve, an arm projecting into the carrier passageway of said terminal and mounted so as to be actuated in one direction by gravity and in the opposite direction by the current of air through the carrier passageway of the terminal, and a connection between said arm projecting into the terminal and said closing means arranged so that when the arm projecting into the terminal is actuated by gravity it will cause the operation of said valve closing means and when operated by the current of air it will stop the operation of said valve closing means.

4. Pneumatic despatch apparatus provided with an inlet terminal, a valve closing the same that is held closed by the suction in the apparatus, and means controlled by the air pressure for catching and holding the valve closed when the suction therein ceases and for releasing the valve when the suction is restored.

5. Pneumatic despatch apparatus provided with inlet terminals, valves closing the same that are held closed by the suction in the apparatus, and means adapted to hold said valves closed that is actuated by gravity when there is no suction in the apparatus and is released by suction in the apparatus, whereby when the vacuum pump stops the valves will be held closed and when it starts they will be released by said holding means.

6. Pneumatic despatch apparatus including a vertically disposed carrier inlet terminal, a valve for closing the carrier inlet thereof, means vertically reciprocable below said terminal on the upper end of which said valve is mounted, and means controlled by the air pressure in the apparatus for elevating said valve supporting means to cause the valve to close the carrier inlet.

7. Pneumatic despatch apparatus including a vertically disposed carrier inlet terminal, reciprocatory valve supporting means below and in line with said terminal, a valve for closing the carrier inlet mounted on the upper end of said valve support and that opens by the gravity of said valve support, and means controlled by the air pressure in the apparatus for elevating said valve support and valve to the closing position.

8. Pneumatic despatch apparatus including a vertically disposed carrier inlet terminal, a cylinder mounted below said terminal and in line therewith, a piston in said cylinder with a piston stem extending upwardly therefrom, a valve on the upper end of said piston stem for closing the carrier inlet, and a connection between said cylinder and the apparatus whereby said piston will be controlled by the air pressure in the apparatus.

9. Pneumatic despatch apparatus including a vertically disposed carrier inlet terminal, a cylinder below and in line with said terminal, a piston therein with a piston stem extending upwardly toward the terminal, a valve mounted on the upper end of said piston stem for closing the carrier inlet, and means for exhausting the air from the cylinder above the piston to elevate the piston and close the inlet terminal.

10. Pneumatic despatch apparatus including a vertically disposed inlet terminal, a cylinder below and in line with said terminal, a piston therein with a piston stem extending upwardly toward the terminal, a valve mounted on the upper end of said piston stem for closing the terminal, means for exhausting the air from the cylinder above the piston to elevate the piston and close the inlet terminal, and means for modifying the action of the air pressure in said cylinder in order to regulate the speed of movement of the piston.

11. Pneumatic despatch apparatus including a vertically disposed inlet terminal, a cylinder below and in line with said terminal, a piston therein with a piston stem extending upwardly toward the terminal, a valve mounted on the upper end of said piston stem for closing the terminal, means for exhausting the air from the cylinder above the piston to elevate the piston and close the inlet terminal, a port in said piston stem connecting with the outside air, and a valve for regulating said port whereby the speed of movement of said piston may be regulated.

12. Pneumatic despatch apparatus including an inlet terminal, a valve for closing the same, a cylinder, a piston in the cylinder with a piston stem tubular and open at both ends and adapted to close said inlet terminal valve, a valve controlled communication between the apparatus and the cylinder whereby the partial exhaust in the apparatus will actuate the piston, a valve for closing the piston stem, and means for opening said piston stem valve when the inlet terminal valve reaches a closing position.

13. Pneumatic despatch apparatus including an inlet terminal, a valve for closing the same, a cylinder with an exhaust port in communication with the apparatus, a piston in the cylinder with a piston stem for controlling the movements of the inlet terminal valve, and a valve for closing said exhaust port in the cylinder that is moved to a closing position by the movement of said piston stem.

14. Pneumatic despatch apparatus including an inlet terminal, a valve for closing the same, a cylinder with an exhaust port in communication with the apparatus whereby the partial exhaust in the apparatus will tend to exhaust the air from the cylinder, a valve for closing said exhaust port in the cylinder, a piston in the cylinder with a piston stem on which the inlet terminal valve is mounted, the parts being arranged so that the valve, piston stem and piston will descend by gravity, and means actuated by said piston stem as it reaches its lower position for opening said exhaust valve in the cylinder, whereby the piston will immediately begin to rise and move the inlet terminal valve to a closing position.

15. Pneumatic despatch apparatus including an inlet terminal, a valve for closing the same, a cylinder with an exhaust port in communication with the apparatus whereby the partial exhaust in the apparatus will tend to exhaust the air from the cylinder, a valve for closing said exhaust port in the cylinder, a piston in the cylinder with a piston stem on which the inlet terminal valve is mounted, the parts being arranged so that the valve, piston stem and piston will descend by gravity, means actuated by said piston stem as it reaches its lower position for opening said exhaust valve in the cylinder, whereby the piston will immediately begin to rise and move the inlet terminal valve to a closing position, and means controlled by the operator for closing said exhaust valve when desired, whereby said valve supporting means will re-descend and ascend to a closing position.

16. Pneumatic despatch apparatus including an inlet terminal, a valve for closing the same, a cylinder with an exhaust port in communication with the apparatus whereby the partial exhaust in the apparatus will tend to exhaust the air from the cylinder, a valve for closing said exhaust port in the cylinder, a piston in the cylinder with a piston stem on which the inlet terminal valve is mounted, the parts being arranged so that the inlet terminal valve, piston stem and piston will descend by gravity, means actuated by said piston stem as it reaches its lower position for opening said exhaust valve in the cylinder whereby the piston will immediately begin to rise and move the inlet terminal valve to a closing position, a valve for closing the upper end of the piston stem, a catch for holding said piston tube valve open, and means for releasing said piston tube valve after said inlet terminal valve supporting means starts on its upward movement.

17. Pneumatic despatch apparatus including an inlet terminal, a valve for closing the same, means for closing said valve, and a paddle pivotally supported within said apparatus with one free end extending into the apparatus and the other free end arranged to operate and control said valve closing means.

18. Pneumatic despatch apparatus including an inlet terminal, a paddle in the apparatus which by gravity projects into the passage-way through the terminal and is arranged so that it will be moved out of the passage-way by a current of air through the terminal when the inlet is opened, a valve for closing said inlet, and means controlled by said paddle for temporarily preventing the closing movement of said valve, so that said valve closing means will be operated when a remote terminal is opened for the insertion of a carrier and enable the carrier to reach its destination before the valve is closed.

19. Pneumatic despatch apparatus including an inlet terminal, a valve for closing the same, a cylinder mounted below the terminal and having a port in communication with the apparatus, a valve for closing and opening the exhaust port into the cylinder, a piston in the cylinder with a piston tube extending upwardly therefrom and on the upper end of which the valve is mounted for closing the inlet opening, a paddle fulcrumed in the inlet terminal so as to extend into the passage-way by gravity and be moved out of the passage-way by a current of air therethrough, a trip in position to close the valve controlling the exhaust port in the cylinder, and a connection between said trip and said paddle whereby when the paddle is actuated by gravity it will close said exhaust port into the cylinder and cause a return movement of the inlet terminal valve supporting means.

20. Pneumatic despatch apparatus including an inlet terminal, a valve for closing the same adapted to be held closed by the suction in the terminal, a cylinder in communication with the apparatus, a piston therein with a piston rod in position to be actuated by gravity, and a catch controlled by the piston rod that is adapted to engage and hold said valve closed when the exhaust in the apparatus is relaxed and the piston permitted to drop by gravity and which is disengaged from its holding position when the suction in the apparatus is removed so as to elevate said piston.

21. Pneumatic despatch apparatus including a series of inlet terminals, a valve for closing each of them, a shaft mounted in proximity with the series of terminals, catches secured to the shaft for engaging each valve and holding it closed, a cylinder in communication with the apparatus, a piston therein with a piston rod in communication with said shaft so that when the piston moves by gravity in one direction all of said catches will engage and hold all of said valves closed and when suction is renewed in the apparatus the piston will be withdrawn and all of said catches released from said valves.

22. Pneumatic despatch apparatus including an inlet terminal, a valve for closing the same, means for closing said valve, a paddle pivotally supported within said apparatus and adapted to be controlled by the air pressure therein, and means actuated by said paddle for controlling said valve closing means.

In witness whereof, I have hereunto affixed my signature in the presence of the witnesses herein named.

THOMAS BEMIS.

Witnesses:
 OLIVE BREEDEN,
 J. H. SWAN.

Copies of this patent may be obtained for five cents each, by addressing the "Commissioner of Patents, Washington, D. C."